United States Patent [19]

Schluderberg

[11] Patent Number: 4,522,781
[45] Date of Patent: Jun. 11, 1985

[54] INTEGRAL NUCLEAR FUEL ELEMENT ASSEMBLY

[75] Inventor: Donald C. Schluderberg, Lynchburg, Va.

[73] Assignee: The Babcock & Wilcox Company, New Orleans, La.

[21] Appl. No.: 327,537

[22] Filed: Dec. 4, 1981

Related U.S. Application Data

[63] Continuation of Ser. No. 816,401, Jul. 18, 1977, abandoned.

[51] Int. Cl.³ ............................ G21C 3/30; G21C 3/06
[52] U.S. Cl. ..................... 376/427; 376/348; 376/434; 376/453; 376/454
[58] Field of Search ............... 376/348, 434, 453, 454, 376/427

[56] References Cited

U.S. PATENT DOCUMENTS

| | | | |
|---|---|---|---|
| 2,902,422 | 9/1959 | Hutter | 204/193.2 |
| 3,278,388 | 10/1966 | Thome | 376/454 |
| 3,674,638 | 7/1972 | McGregor | 376/454 |
| 3,859,165 | 1/1975 | Radkowsky | 376/174 X |
| 4,060,454 | 11/1977 | Miertschin | 376/427 |
| 4,324,618 | 4/1982 | Schluderberg | 376/454 |

FOREIGN PATENT DOCUMENTS 1464962 4/1969 Fed. Rep. of Germany .
1464986 6/1969 Fed. Rep. of Germany .

*Primary Examiner*—Donald P. Walsh
*Attorney, Agent, or Firm*—James C. Simmons; Robert H. Kelly; Robert J. Edwards

[57] ABSTRACT

An integral nuclear fuel element assembly utilizes longitudinally finned fuel pins. The continuous or interrupted fins of the fuel pins are brazed to fins of juxtaposed fuel pins or directly to the juxtaposed fuel pins or both. The integrally brazed fuel assembly is designed to satisfy the thermal and hydraulic requirements of a fuel assembly lattice having moderator to fuel atom ratios required to achieve high conversion and breeding ratios.

9 Claims, 5 Drawing Figures

INTEGRAL NUCLEAR FUEL ELEMENT ASSEMBLY

This application is a continuation of application Ser. No. 816,401, filed July 18, 1977, now abandoned.

BACKGROUND OF THE INVENTION

1. Field of the Invention

This invention relates to a fuel assembly design for use in a nuclear reactor and particularly to a fast breeder reactor utilizing plutonium as a fuel and pressurized light or heavy water as a reactor coolant and moderator.

2. Description of the Prior Art

The advantages of utilizing nuclear breeder reactors which convert fertile material into fissile material and generate heat, e.g. for power generation, have been widely recognized in view of the limited known fissionable material resources of the world. Development of breeder reactors which convert the more abundant fertile uranium-238 into fissile plutonium-239 utilizing the latter as a fuel, possibly in conjunction with plutonium generated in other known reactors, and breed more fissionable material than is consumed, is highly desirable. Since extensive technological development and experience exists in the design and construction of pressurized light and heavy water reactor plants, use of the pressurized water technology in a breeder application represents an attractive alternative to development of other breeder options.

Heavy water, deuterium oxide ($D_2O$), has essentially the same physical and chemical properties as light water, $H_2O$. Its nuclear properties, however, are different, the neutron absorption cross section and slowing down power of $D_2O$ being markedly lower than that of $H_2O$. Hence, the use of $D_2O$ as a coolant in a fast breeder application is desirable due to its nuclear characteristics and the applicability of pressurized water technology. In a plutonium-uranium-deuterium oxide ($Pu-U-D_2O$) reactor system, as the coolant to fuel atom ratio decreases, it is known that the conversion or breeding ratios increase. The breeding ratio is the ratio of the number of fissile atoms produced to those consumed. High breeding ratios, approaching a value of 1.40, may be realized in a $Pu-U-D_2O$ system if a fuel lattice geometry is developed wherein moderator to fuel volume ratios are adjusted to yield moderator to fuel atom ratios approaching 1.0 or less. As the selection of a moderator to fuel atom ratio defines the volume of coolant per unit mass of fuel, it can be appreciated that difficulties arise in designing a fuel lattice capable of passing adequate cooling flow rate at low moderator to fuel ratios. The high flow rates needed to assure adequate reactor core cooling necessitate high velocities in flow channels that are significantly restricted when achieving a low moderator to fuel ratio. In the tightly packed fuel pin lattices, the use of conventional spacer grids is disadvantageous owing to inherent limits in fuel pin packing due to the interposed grids, a tendency to flow induced spacer grid vibration, the parasitic absorption of the grid plate material, and the increase in hydraulic pressure loss resulting from introduction of grids within the restricted flow passages.

The prior art teaches heavy water moderated and cooled reactor designs for particular fuel "rod" diameters and spacings within a moderator to fuel atom ratio range from 0.35 to 4.0 and suggests that a moderator to fuel atom ratio of approximately 0.3 can be achieved in a fuel lattice utilizing touching fuel rods arranged in a triangular pitch. Reduction of heat flux to the degree necessary to avoid potentially destructive hot spots at fuel pin contact points, however, would severely limit the capability of operating such a core at pressurized water reactor conditions. Furthermore, close spacing of the fuel pins may lead to plugging by solid particles carried by the coolant and prohibitively high reactor coolant pumping power requirements. Other difficulties become readily apparent. On the one hand, elimination of spacer grids is desirable in order to permit the higher coolant flow velocities needed to approach the moderator to fuel atom ratios yielding the high conversion ratio of the touching fuel rod configuration. On the other hand, elimination of spacer grids may result in imprecise fuel pin spacing, flow induced vibration and unequal cooling.

SUMMARY OF THE INVENTION

In accordance with the principles of the invention, the disadvantages of the prior art, discussed above, are effectively surmounted by the practice of the invention. A fuel assembly, made in accordance with this invention, utilizes longitudinally finned fuel pin cladding tubes arranged to form an integral fuel assembly by brazing together the continuous or interrupted fins of one fuel pin to the fins of other fuel pins. The integrally brazed fin fuel pin assembly is designed to satisfy the thermal and hydraulic requirements of the very tight lattice required to achieve high breeding ratios.

In an alternate embodiment the fins of some fuel pins may be connected directly to the tubular section of other fuel pins so that the resulting assemblies have moderator to fuel volume ratios which tend to increase the breeding ratio in $Pu-U-D_2O$ reactor core.

In a further embodiment of the invention, the core is fabricated from a solid material having passages which are alternatively suited for coolant flow and fuel retention.

Practice of the invention overcomes the disadvantages of the prior art by providing means for obtaining moderator to fuel ratios which are conducive to a high $Pu-U-D_2O$ reactor breeding ratio while assuring accurate spacing of the fuel pins without the parasitic losses associated with the prior art's use of spacer grids. Furthermore, the arrangements of the invention eliminate hydraulic pressure losses associated with conventional spacer grids and reduce the tendency of fuel pin vibration. The finned fuel pin arrangements, moreover, increase the strength of the pins, increase the available heat transfer surface and improve the overall heat transfer coefficient.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
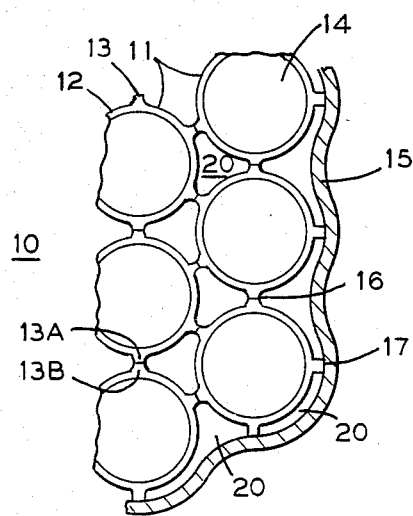
FIG. 1 is a partial section in plan of a fuel assembly.

FIG. 1 shows part of a nuclear fuel assembly 10 of closely packed fuel pins 11 arranged in an array with their longitudinal axes in parallel. Each fuel pin 11 consists of generally tubular cladding 12 which has a plurality of longitudinally extending fins 13 formed as part of the outer surface of the cladding and spaced circumferentially thereabout. A nuclear fuel 14, consisting of a mixture of fissile and fertile material, is contained within the cladding 12. The fuel pins 11 in FIG. 1 are arranged so that the extremity of each fin 13A abuts with the extremity of a fin 13B of a juxtaposed fuel pin; fins of peripheral fuel pins may abut the fuel assembly can structure 15. The extremities of the fins shown in FIG. 1 are joined to each other and to the reactor can structure by means of brazing at 16 and 17, respectively, to form the integral fuel assembly 10.

Figure 2:
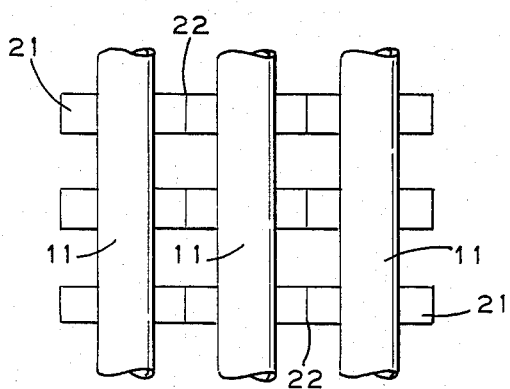
FIG. 2 is an elevation view of part of a number of finned fuel elements arranged in accordance with an alternate embodiment of the invention.
Figure 3:
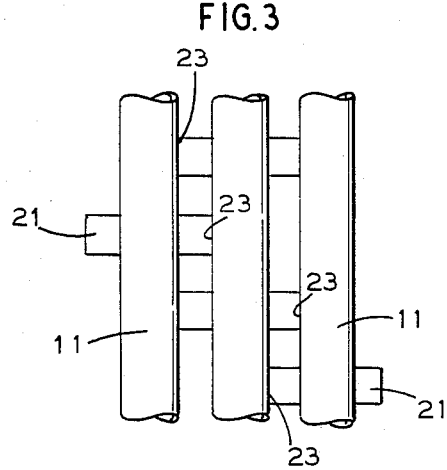
FIG. 3 is an elevation view of part of a number of fuel elements arranged in accordance with another alternate embodiment of the invention.

The fins 13, in one embodiment, extend without interruption along the longitudinal surface of the fuel pin forming channels 20 in the interspaces of the fuel pins which direct reactor coolant flow (not shown) therewithin generally in parallel with the longitudinal axis of the pins The fins 13, however, need not extend continuously along the length of the fuel pins but can be interrupted fins 21, as shown in FIGS. 2 and 3, so as to allow transverse flow and intermixing of the coolant through the fuel pin interspaces. The axially interrupted fins 21 of juxtaposed fuel pins may be brazed to each other at 22 (FIG. 2) or, as shown in FIG. 3 directly to the tubular portion of the fuel pin at 23. An assembly utilizing a combination of both arrangements shown in FIGS. 2 and 3, i.e., fin to fin contact and fin to tube contact, is also possible.

Figure 4:
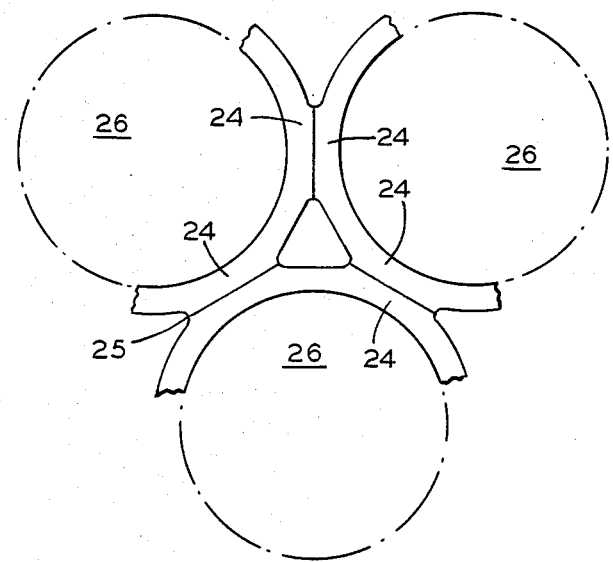
FIG. 4 is a partial section plan of a fuel assembly having fuel elements arranged in accordance with still another embodiment of the invention.

A finned fuel pin 26 design utilizing broad fins 24 brazed to each other at 25 is shown in FIG. 4. Broad fins may be utilized to further limit the moderator volume fraction at some sacrifice of specific core power.

Elimination of conventional spacer grids and the formation of fins as part of the tube cladding permits reduction of the reactor core moderator volume fraction to values consistent with the achievement of the desired moderator to fuel atom ratios. Illustrative physical design parameters are set forth in Table 1.

TABLE I

| Example | 1 | 2 | 3 |
|---|---|---|---|
| Fuel Pin Diameter, inches | .35 | .40 | .40 |
| Fuel Pin Pitch, inches | .39 | .43 | .43 |
| Clad Thickness, inches | .015 | .020 | .020 |
| Clad Material | Incoloy 800 | Type 316 Stainless Steel | Type 316 Stainless Steel |
| Pitch - Diameter, inches | .040 | .030 | .030 |
| Number of fins per Pin | 6 | 3 | 3 |
| Fin height, inches | .020 | .030 | .030 |
| Fin width, inches | .020 | .030 | .030 |
| Fin interruption, percent of length | 0 | 0 | 30 |
| Fuel Volume Fraction | .6105 | .6357 | .6357 |
| Structural Volume Fraction | .1381 | .1659 | .1541 |
| Coolant Volume Fraction | .2514 | .1984 | .2102 |
| Fuel/Coolant Volume Fraction Ratio | 2.43 | 3.20 | 3.02 |
| Moderator/Fuel Atom Ratio | .82 | .624 | .66 |

The fuel pins in the examples of Table I are formed in the shapes of rods. The fuel pins of examples 1 and 2 are provided with continuous fins along their length. Example 3 illustrates an alternate embodiment of example 2 wherein the fins traverse approximately thirty percent of the length of the rods. The values for the moderator to fuel atom ratios shown in Table I approximate normal pressurized water reactor operating conditions including primary coolant temperature and pressure, fuel pellet shape, clearances between the fuel pellets and clad, and percent of theoretical $UO_2$ density achieved in the pellet.

The fuel assemblies of Table I would be typically formed by furnace brazing in a hydrogen atmosphere at 1950° to 2000° F. with a brazing alloy tradenamed "Nicrobraz 50" (available from the Wall-Colmonoy Corp., Detroit, Mich.) using jigs, fixtures and methods of braze alloy placement known in the furnace brazing art.

Figure 5:
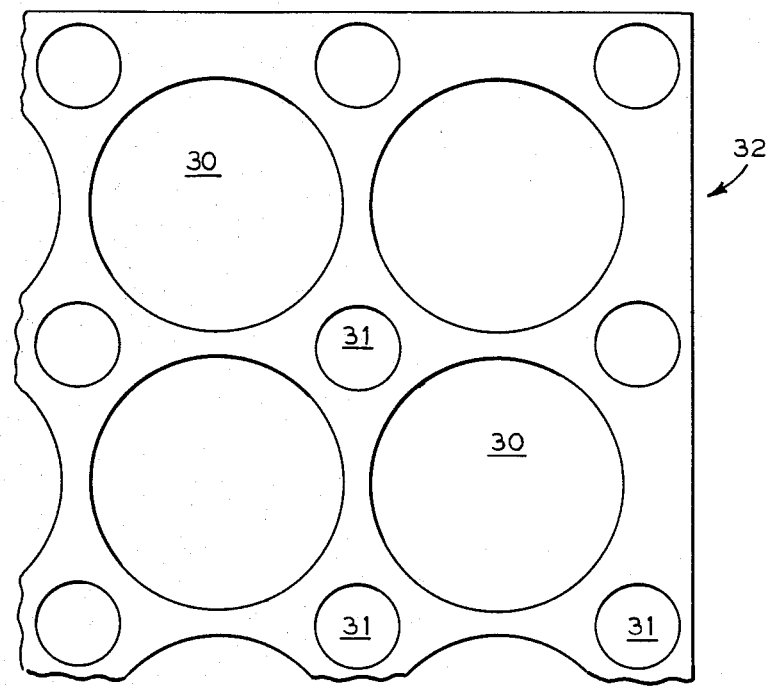
FIG. 5 is a part plan of a block core arrangement for a low temperature reactor.

In still another embodiment, FIG. 5 illustrates a design for low temperature reactors suitable for breeding plutonium and low heat generation purpose, e.g. residential heating. In this embodiment a fuel assembly is fabricated from a block 32 of metal, e.g., aluminum alloy. Transversely spaced parallel channels are formed for flow passage 31 and for fuel 30. The surfaces of the flow channels may be roughened where needed to increase critical heat flux. Illustrative design parameters for a block type reactor are shown in Table II.

TABLE II

| Example | 1 | 2 |
|---|---|---|
| Fuel channel diameter, inches | .40 | .325 |
| Fuel channel pitch, inches | .500 | .40 |
| Coolant channel diameter, inches | .156 | .125 |
| Coolant channel pitch, inches | .500 | .40 |
| Fuel volume fraction | .503 | .518 |
| Structure Volume fraction | .421 | .405 |
| Coolant Volume fraction | .076 | .0766 |
| Fuel/Coolant Volume Fraction Ratio | 6.62 | 6.76 |
| Moderator/Fuel Atom Ratio | .44 | .43 |

The moderator to fuel atom ratio of Table II corresponds to a primary coolant water temperature of about 250° F. at low pressure. Other process parameters are similar to those assumed for Table I.

The geometry of the coolant and fuel channels in the block type fuel assembly will produce a degree of what might be termed "moderator escape probability" which will serve to harden the neutron spectrum and improve the core conversion or breeding ratio. This occurs because each fuel channel is not completely surrounded by moderator. Hence, some neutrons produced in a fuel channel can pass to another fuel channel without traversing a volume containing moderator, thereby improving the breeding or conversion ratio since the average neutron energy at which fission occurs is increased. This, combined with a moderator to fuel ratio less than that which can be achieved with touching fuel pins, should yield a uniquely high breeding ratio for either H$_2$O or D$_2$O cooling.

By virtue of the moderator to fuel atom ratios made possible by these approaches to fuel assembly design, fast reactor physics can be applied to pressurized water reactor tehnology. This combination has important advantages including:

a. Avoidance of gas or liquid metal coolants otherwise used for fast reactors.
b. Reduced clad operating temperature.
c. Availability of additional methods of reactivity control, namely, chemical shim and spectral shift control.

Availability of additional methods of reactivity control reduces the normal dependence of fast reactors on control rods. They allow a general reduction in required control rod worth and provide a means for continuous adjustment of excess reactivity to a minimum value, thereby greatly enhancing the safety of fast reactor cores. This would include operation with higher worth rods out of the core.

I claim:

1. In a pressurized water moderated and cooled fast breeder nuclear reactor, a fuel assembly comprising a nuclear fuel and a plurality of fuel pins disposed with parallel longitudinal axes in a closely packed array, each fuel pin consisting essentially of a generally tubular cladding bearing said nuclear fuel and a longitudinally extending fin extending from said cladding to each juxtaposed fuel pin and bonded metallurgically thereto to form an integral fuel assembly having coolant passages which are defined by said cladding surface and said fins and which are unobstructed by spacer grids, and said fuel pins including said fins are sized such that the fuel assembly has a structural volume fraction less than about 0.166 and a fuel to coolant volume fraction ratio in the range between about 2.43 and about 3.20.

2. In a water moderated and cooled fast breeder nuclear reactor, a fuel assembly comprising a nuclear fuel and a metallic block, said block having a plurality of first and second transversely spaced parallel channels, said first channels containing said nuclear fuel and said second channels defining means for flow of moderator coolant through said block, said first channels and said second channels being further disposed such that neutrons can pass between first channels without entering one of the second channels, and said first and second channels are sized to provide a moderator to fuel atom ratio which is not greater than about 0.44.

3. A fuel assembly according to claim 2 wherein said block is formed from an aluminum alloy.

4. A fuel assembly according to claim 1 wherein said fin is metallurgically bonded to a juxtaposed fuel pin by means of a brazed connection.

5. A fuel assembly according to any one of claims 1 or 4 wherein said fin extends continuously without interruption along the surface of said cladding in a direction generally parallel with the longitudinal axis of said respective fuel pin.

6. A fuel assembly according to any one of claims 1 or 4 wherein said nuclear fuel is plutonium and the pressurized water is heavy water.

7. A fuel assembly according to any one of claims 2 or 3 wherein the pressurized water is heavy water.

8. A fuel assembly according to any one of claims 2 or 3 wherein the moderator to fuel atom ratio ranges from 0.43 to 0.44.

9. A fuel assembly according to any one of claims 2 or 3 further having a structure volume fraction which is in the range of 0.405 to 0.421.

* * * * *